United States Patent
Steinmetz et al.

(10) Patent No.: US 9,638,265 B2
(45) Date of Patent: May 2, 2017

(54) SEGMENTED SHEET METAL SUPPORT

(71) Applicant: Schaeffler Technologies AG & Co. KG, Herzogenaurach (DE)

(72) Inventors: Stefan Steinmetz, Esslingen (DE); Patrick Knecht, Muggensturm (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/892,093

(22) PCT Filed: Jun. 13, 2014

(86) PCT No.: PCT/DE2014/200260
§ 371 (c)(1),
(2) Date: Nov. 18, 2015

(87) PCT Pub. No.: WO2014/206409
PCT Pub. Date: Dec. 31, 2014

(65) Prior Publication Data
US 2016/0116002 A1  Apr. 28, 2016

(30) Foreign Application Priority Data
Jun. 26, 2013 (DE) .................. 10 2013 212 185

(51) Int. Cl.
*F16D 13/64* (2006.01)

(52) U.S. Cl.
CPC .......... *F16D 13/64* (2013.01); *F16D 13/648* (2013.01)

(58) Field of Classification Search
None
See application file for complete search history.

(56) References Cited

U.S. PATENT DOCUMENTS

| 3,620,339 | A | * | 11/1971 | Hermann Becking | F16D 27/14 192/107 C |
|---|---|---|---|---|---|
| 7,798,301 | B2 | | 9/2010 | Keating et al. | |
| 8,360,221 | B2 | | 1/2013 | Neubauer et al. | |
| 2006/0144668 | A1 | | 7/2006 | Voegele | |

FOREIGN PATENT DOCUMENTS

| DE | 102007053758 | 3/2009 |
| EP | 1650454 | 4/2006 |
| GB | 1241756 | 8/1971 |

* cited by examiner

*Primary Examiner* — Adam Krupicka
(74) *Attorney, Agent, or Firm* — Volpe and Koenig, P.C.

(57) ABSTRACT

The invention relates to a segmented carrier sheet for at least one pad, such as a fin, comprising at least two segments. The invention is characterized in that the segments are connected to each other in a material-to-material fashion.

7 Claims, 1 Drawing Sheet

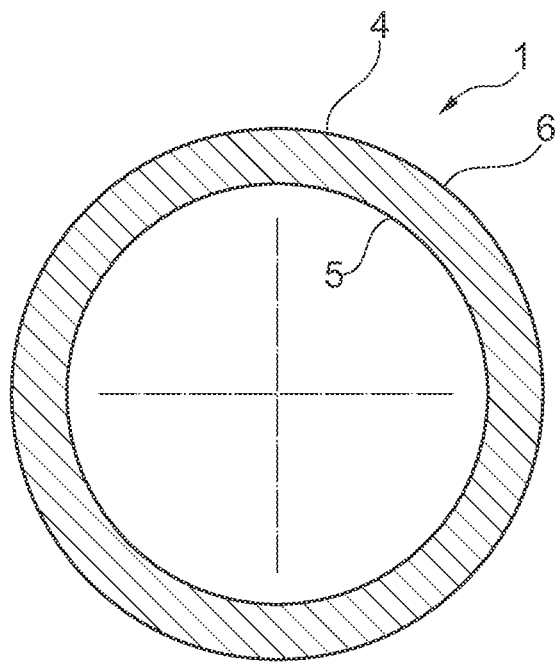
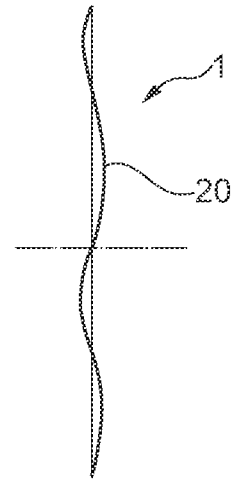
Fig. 1            Fig. 2
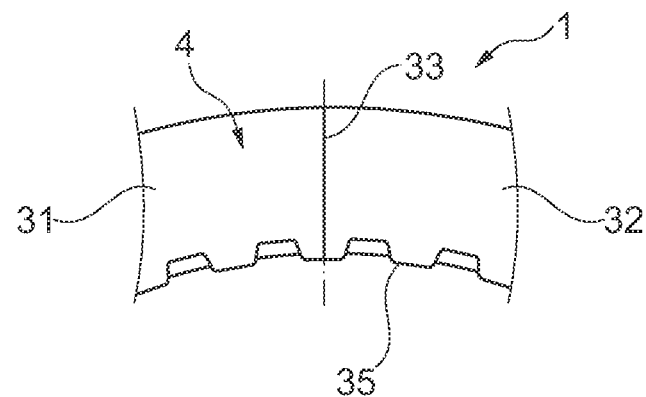
Fig. 3

SEGMENTED SHEET METAL SUPPORT

BACKGROUND

The invention relates to a segmented carrier sheet for at least one pad, such as a fin, comprising at least two segments.

A segmented carrier sheet for a fin is known from the German publication DE 10 2007 053 758 A1, which is composed like a puzzle from at least two segments, forming a boundary between the segments, with one segment comprising a projections, which is received in a recess in the other segment forming a boundary section between the projection and the recess, and the projection and the recess are embodied such that the adjacent segments, in reference to the circumferential direction of the carrier sheet engage, from behind at least a first and a second part of the boundary section.

SUMMARY

The objective of the invention is to provide a segmented carrier sheet for at least one pad, such as a fin, comprising at least two segments, which can be produced cost-effectively and exhibits a long life span.

The objective is attained in a segmented carrier sheet for at least one pad, such as a fin, comprising at least two segments such that the segments are connected to each other in a material-to-material connection. The material-to-material connection has proven particularly advantageous with regards to the embodiment of the component geometry. Almost unlimited part thicknesses can be used for the carrier sheet according to the invention. Furthermore, the carrier sheet according to the invention exhibits extended stability during operation of the product. This is based, for example, in that the material-to-material connections between the segments are very stable even under alternating stress, particularly in combination with a corrugation of the carrier sheet. Furthermore, the material-to-material connections of the segments allow a very unrestricted design of almost arbitrary force-path characteristics. Overall, the production process of the carrier sheet according to the invention is designed in a relatively simple fashion due to the material-to-material connections.

A preferred exemplary embodiment of the segmented carrier sheet is characterized in that the carrier sheet exhibits a corrugation extending in the circumferential direction. The corrugation is inserted into the carrier sheet advantageously after the bonding of the segments using the material-to-material connections.

Another preferred exemplary embodiment of the segmented carrier sheet is characterized in that the corrugation extending in the circumferential direction comprises four to nine waves. This number of waves has proven particularly advantageous in experiments performed within the scope of the invention.

Another further preferred exemplary embodiment of the segmented carrier sheet is characterized in that the segments show one-dimensional geometries at the connection sites. In the circumferential direction, the segments may advantageously be limited by straight lines in reference to the abutting edges, seen in a top view. This way the production of individual segments is considerably facilitated.

Another preferred exemplary embodiment of the segmented carrier sheet is characterized in that the segments have multi-dimensional geometries at the connection sites. This may represent two-dimensional but also three-dimensional geometries. The geometries of the segments at the connection sites are advantageously selected such that the production and/or stability of the material-to-material connections are simplified and/or improved.

Another preferred exemplary embodiment of the segmented carrier sheet is characterized in that the carrier sheet is divided into two to six segments, which are connected to each other in a material-to-material fashion. This number has proven particularly advantageous in experiments performed within the scope of the present invention.

Another preferred exemplary embodiment of the segmented carrier sheet is characterized in that the segments are connected to each other in a material-to-material fashion using laser welding. The individual segments can be produced for example by way of punching. Laser welding has proven particularly advantageous with regards to the stability of the carrier sheet.

Another preferred exemplary embodiment of the segmented carrier sheet is characterized in that the carrier sheet essentially has the form of an annular disk. The shape of the carrier sheet may also be identical to carrier sheets of prior art.

Another preferred exemplary embodiment of the segmented carrier sheet is characterized in that the carrier sheet exhibits radially inwardly and/or radially outwardly a form-fitting geometry. The form-fitting geometry is preferably embodied as gears. The form-fitting geometry is advantageously inserted into the carrier sheet after the material-to-material connection of the segments to each other, for example by way of punching.

The invention further relates to a friction pad, particularly a wet-running friction pad, comprising an above-described carrier sheet.

The invention also relates to segments serving for the production of the carrier sheet according to the invention. The segments can be traded separately.

BRIEF DESCRIPTION OF THE DRAWINGS

Additional advantages, features, and details of the invention are discernible from the following description, in which various embodiments are described in detail with reference to the drawing. Here it shows:

FIG. 1 a simplified illustration of a carrier sheet according to the invention in a top view;

FIG. 2 the carrier sheet of FIG. 1 in a side view, and

FIG. 3 an enlarged detail of a section of the carrier sheet shown in FIGS. 1 and 2 in a top view.

DETAILED DESCRIPTION OF THE PREFERRED EMBODIMENTS

A carrier sheet 1 is shown in FIGS. 1 to 3 in various illustrations. The carrier sheet 1 serves for the production of wet running pads, particularly wet running fins, used for example in wet running duplex clutches as well as in clutches in the two-wheeler field. For the production of a wet running fin and/or wet running—friction pad, here pads, particularly friction pads, are fastened at the carrier sheet 1, for example with the help of riveting elements.

The carrier sheet 1 has the form of an annular disk 4 with an interior diameter 5 and an exterior diameter 6. FIG. 2 shows that the carrier sheet 1 comprises a corrugation 20. The corrugation 20 extends in the circumferential direction of the carrier sheet 1. The carrier sheet 1 according to the invention preferably comprises four to nine waves in the circumferential direction.

It is discernible from FIG. 3 that the carrier sheet 1 is formed from several segments 31, 32. The segments 31, 32 are connected to each other in a material-to-material fashion at a connection site 33. The material-to-material connection is preferably realized by way of laser welding. This way, in a simple fashion a corrugated, segmented carrier sheet can be produced, which based on the material-to-material connections between the individual segments 31, 32 is very stable and exhibits a very long life span.

The carrier sheet 1 according to the invention preferably comprises two to six segments, connected to each other by a material-to-material connection, particularly by way of laser welding. FIG. 3 shows that the segments 31, 32 show straight abutting edges at the connection site. This way the production of the material-to-material connection, particularly by way of laser welding, is simplified.

In FIG. 3, it is further discernible that the carrier sheet 1 is radially inwardly provided with internal gears 35. The internal gears 35 are produced for example by punching the carrier sheet 1. Alternatively or additionally the carrier sheet 1 may be provided with exterior gears.

The interior gears 35 serve to connect a fin for the carrier sheet 1 according to the invention in a form-fitting fashion to a fin carrier. For this purpose, the fin carrier is advantageously provided with exterior gears, engaged by the interior gears 35 of the carrier sheet 1.

LIST OF REFERENCE CHARACTERS

1 carrier sheet
4 annular disk
5 interior diameter
6 exterior diameter
20 corrugation
31 segment
32 segment
33 connection site
35 interior gears

The invention claimed is:

1. A segmented carrier sheet for at least one pad, comprising at least two segments, that are connected to each other in a material-to-material fashion, and the at least two segments have one-dimensional geometries at connection sites, further comprising a corrugation extending in a circumferential direction and the corrugation extending in the circumferential direction comprises four to nine waves.

2. The segmented carrier sheet according to claim 1, wherein the carrier sheet is divided into two to six segments which are connected to each other in a material-to-material fashion.

3. The segmented carrier sheet according to claim 1, wherein the segments are connected to each other in a material-to-material fashion by laser welding.

4. The segmented carrier sheet according to claim 1, wherein the carrier sheet has the form of an annular disk.

5. The segmented carrier sheet according to claim 1, wherein the carrier sheet has radially inwardly or radially outwardly a form-fitting geometry.

6. A friction fin, comprising a segmented carrier sheet according to claim 1.

7. The friction fin of claim 6, wherein the friction fin is wet running.

* * * * *